United States Patent
Feng et al.

(10) Patent No.: US 10,706,442 B2
(45) Date of Patent: Jul. 7, 2020

(54) BEHAVIOR-BASED CUSTOM AUDIENCES GENERATION

(71) Applicant: Facebook, Inc., Menlo Park, CA (US)

(72) Inventors: Shi Feng, Palo Alto, CA (US); Chuhan Yang, Sunnyvale, CA (US); Mayank Kumar, Redwood City, CA (US); Jason Jiawei Liao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 400 days.

(21) Appl. No.: 15/445,902

(22) Filed: Feb. 28, 2017

(65) Prior Publication Data
US 2018/0247344 A1    Aug. 30, 2018

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0277* (2013.01); *G06Q 30/0255* (2013.01); *G06Q 30/0276* (2013.01); *G06Q 50/01* (2013.01)

(58) Field of Classification Search
None
See application file for complete search history.

(56) References Cited

U.S. PATENT DOCUMENTS

2013/0036015 A1* 2/2013 Bender .................. G06Q 30/02
                                                                  705/14.66
2017/0116642 A1* 4/2017 Meyer .................... G06Q 30/02

* cited by examiner

*Primary Examiner* — Alvin L Brown
(74) *Attorney, Agent, or Firm* — Baker & Hostetler LLP

(57) ABSTRACT

An online system receives one or more aggregation rules associated with a third party system that determine online system users' eligibility for receiving content items provided by the third party system using the online system users' behavior. When an online system user performs actions related to content provided by the third party system via a client device, events describing the actions are generated and communicated from the client device to the online system. The online system evaluates a user's eligibility when a user performs an action by applying an aggregation rule to an event corresponding to the user's action and other events associated with the user corresponding to the user's previous actions. The online system may re-evaluate a user's eligibility at a later time if the user is determined to be ineligible. The online system provides content items to eligible users for presentation.

19 Claims, 3 Drawing Sheets

BEHAVIOR-BASED CUSTOM AUDIENCES GENERATION

BACKGROUND

Field of Art

The subject matter described herein generally relates to web-based distribution of content, and more specifically to generating custom audiences for content items based on users' actions.

Description of the Related Art

An online system, such as a social networking system, allows its users to connect to and to communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, an online system provides an ideal forum for advertisers to increase awareness about products or services by presenting advertisements ("ads") to online system users.

Presenting ads to users of an online system allows an advertiser to gain public attention for products or services and to persuade online system users to take an action regarding the advertiser's products, services, opinions, or causes. However, users are not always interested in the products or services being advertised and do not always interact with ads presented to them. As a result, advertisers waste resources by sending ads to users that are not likely to interact with the ads or take an action regarding the advertiser's products, services, opinions, or causes. Therefore, it is to advertisers' best interest that ads are presented to users who are likely to interact with the ads and who are likely to take an action. However, to effectively identify those users who may be interested in an advertiser's ads is a challenging and expensive task.

SUMMARY

To allow a third party system to target ads more effectively to users of an online system, the online system determines users' eligibility to receive ads from the third party system in real time based at least on their actions performed on the third party system or other external systems. The online system determines the audience for receiving ads of the third party system as well as select different ads to present to different audiences. The online system may provide an audience widget to the third party system for inclusion in the third party system's content. The audience widget is configured to report users' actions that may be of interest to the third party system and enables the online system to custom ads provision to the users based at least on their behavior on behalf of the third party system. In particular, the third party system includes the audience widget (e.g., a tracking pixel) in a website, a webpage, or a native application. When a client device executes the instructions or other code (e.g., when a browser renders a webpage of a website or when a native application renders content from the website), the client device communicates information identifying the user and describing the user's actions to the online system. For example, the client device communicates identifiers of pages viewed (e.g., URLs), types of the actions (e.g., visiting a website, viewing a webpage, making a purchase, adding an item to a shopping cart, etc.), timestamps of the actions, and other details of the actions. By using the audience widget, the third party system may designate events of interest to be tracked by the online system, which may be customized based on the events of interest to a third-party system. For example, the third-party may generate an event representing the value of items added to a user's basket before a sale, or a value of a conversion (e.g., a completed sale) by a user. This permits a third-party system to define and designate actions and values of the actions without relying on predefined types of actions by the online system.

The online system receives an event describing the user's action and applies one or more aggregation rules provided by the third party system to determine eligibility for receiving advertisements or other content provided by the third-party system. Since the third-party system may define events of interest and the rules for interpreting the events, the third-party systems are better able to customize the basis on which users are eligible for content of the third-party system. The one or more aggregation rules describe criteria for determining whether or not a user is eligible for receiving a particular ad or other content. An aggregation rule includes one or more parameters and describes conditions for determining eligible users to view the advertisement or other content. Stated another way, the aggregation rules define an audience for which to serve the related advertisement or other content item. The aggregation rules may be specified with an advertisement for an advertising campaign or other type of ongoing campaign to provide content to users of the online system. For example, an aggregation rule describes a threshold amount of time that an eligible user spends on visiting a website, a threshold amount of purchase that an eligible user spends at a web site, a threshold rate of an eligible user visiting a website, a threshold interval between an eligible user's two consecutive visits of a website, etc. Various events provided by the user's interactions with the third-party system can be used to determine these desired characteristics of a user's interactions with the third-party system. An aggregation rule also describes a threshold percentile of an amount of time that an eligible user spends on visiting a website relative to other users, a threshold percentile of a purchase amount that an eligible user spends at a website relative to other users, a threshold percentile of a rate of an eligible user visiting a website relative to other users, a threshold percentile of an interval between an eligible users' consecutive visits of a website relative to other users, etc. In some embodiments, an aggregation rule designates a function that receives events as inputs and outputs an action score indicating characteristics (e.g., an extent) of a user's actions.

When receiving an event, the online system retrieves other events describing other actions that the user has performed in the past. The online system determines the particular user's action characteristics (e.g., an interval between consecutive actions, a rate of actions, an amount of time, an amount of purchase, etc.) using the received event as well as the retrieved events. The retrieved events may be of the same event type as the received event. In addition, the retrieved events are associated with actions that were performed within a time frame of the action corresponding to the received event. The online system compares the determined action characteristics to the conditions according to the aggregation rules to determine a user's eligibility for related content. If a user is determined to be ineligible, the online system re-evaluates a user's eligibility at a later time.

When the online system identifies an impression opportunity to present an ad to an eligible user, the online system selects an ad according to the one or more aggregation rules for inclusion in an ad auction for the impression opportunity. Since the third party system can define the actions and specify the rules for evaluating the actions, third parties gain additional control to fine tune users of interest to the advertiser and audiences for presentation of content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
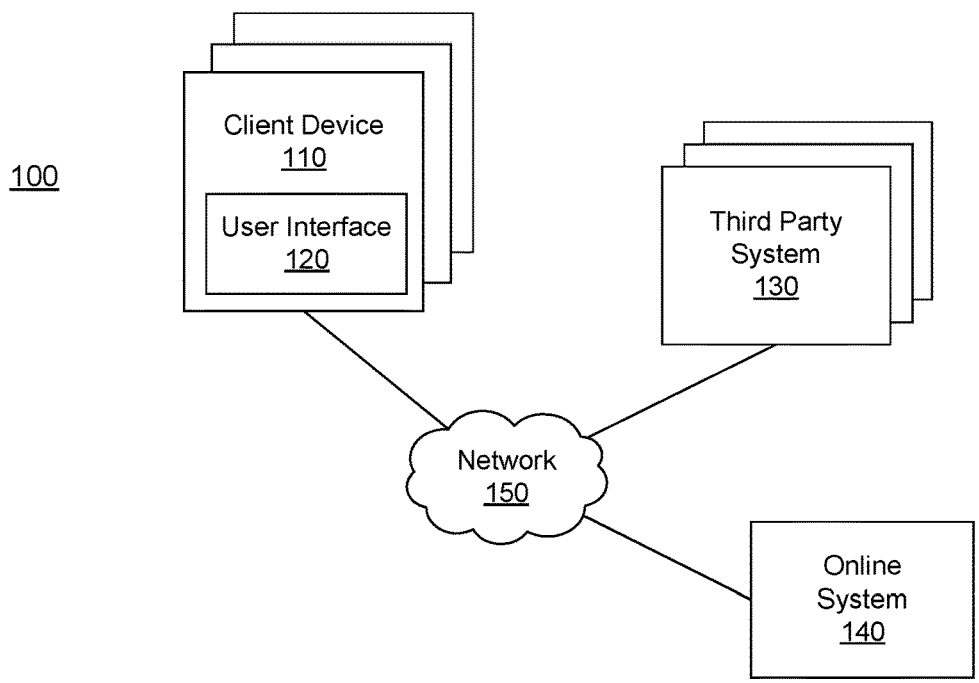
FIG. 1 is a block diagram of system environment for generating custom audiences using users' behavior, according to one embodiment.

FIG. 1 is a block diagram of system environment 100 for generating custom audiences using users' behavior on a third party system. System environment 100 shown by FIG. 1 comprises one or more client devices 110, one or more third party systems 130, an online system 140, and a network 150. In alternative configurations, different and/or additional components may be included in the system environment 100. The embodiments described herein can be adapted to online systems that are not online systems. The online system 140 determines custom audiences for presentation of content using events defined by the third party system 130 that reflect user actions. The third party thus may define events of interest and characterization of the events, as well as the rules for aggregating and analyzing the events at the online system 140 for generating the custom audience of users to view related content.

The client device 110 is a computing device capable of receiving user input as well as transmitting and/or receiving data via the network 150. A client device 110 is a device having computer functionality, such as a smartphone, personal digital assistant (PDA), a mobile telephone, or another suitable device. A client device 110 is configured to communicate via the network 150. In one embodiment, a client device 110 executes an application allowing a user of the client device 110 to interact with the online system 140. For example, a client device 110 executes a browser application to enable interaction between the client device 110 and the online system 140 via the network 150. In another embodiment, a client device 110 interacts with the online system 140 through an application programming interface (API) running on a native operating system of the client device 110, such as IOS® or ANDROID™. The client device 110 also includes a user interface 120 that allows a user to interact with the client device 110. Via the user interface 120, a user can further interact with the online system 140.

The client device 110 can execute an application associated with the online system 140 and present the user interface 120 based on information received from the online system 140.

One or more third party systems 130 may be coupled to the network 150 for communicating with the online system 140. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as ads, content, or information about an application provided by the third party system 130.

The network 150 includes any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The online system 140 includes a computing environment that allows users of the online system 140 to communicate or otherwise interact with each other and access content. In addition, the online system 140 provides advertising services for advertisers. For example, the online system 140 receives an advertising campaign ("ad campaign) from an advertiser, that includes one or more advertisements ("ads") for presentation to users of the online system 140. The ad campaign may be received from a third party system 130 or may be maintained by the online system 140. The online system 140 presents ads on behalf of advertisers to users of the online system 140 according to the advertisers' requirement to meet the advertisers' goals as further described below.

Online System

Figure 2:
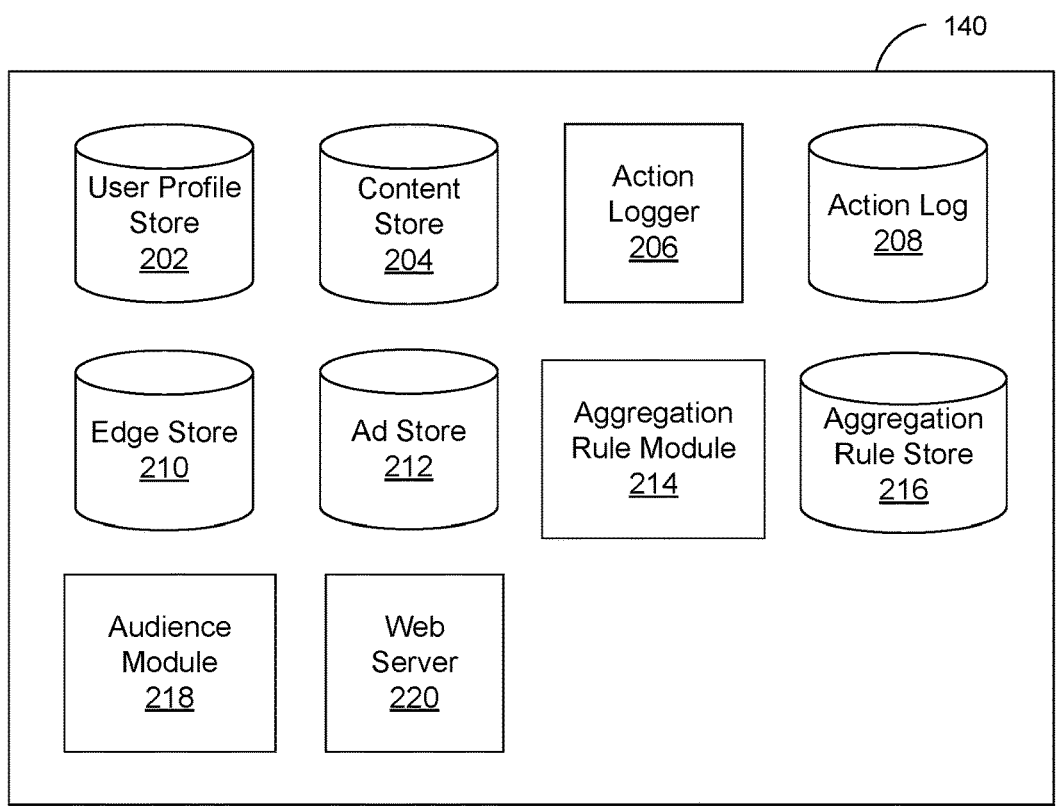
FIG. 2 is a block diagram of an online system, according to one embodiment.

FIG. 2 is a block diagram of a system architecture of the online system 140, according to one embodiment. The online system 140 shown in FIG. 2 includes a user profile store 202, a content store 204, an action logger 206, an action log 208, an edge store 210, an ad request store 212, an aggregation rule module 214, an aggregation rule store 216, an audience module 218, and a web server 220. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 202. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 202 may also maintain references to actions by the corresponding user performed on content items in the content store 204 and stored in the action log 208.

While user profiles in the user profile store 202 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 204 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 204, such as status updates, photos tagged by users to be associated with other objects in the online system, events, groups or applications. In some embodiments, objects are received from third party applications or third party applications separate from the online system 204. In one embodiment, objects in the content store 204 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 206 receives communications about user actions internal to and/or external to the online system 140, populating the action log 208 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 208.

The action log 208 may be used by the online system 140 to track user actions on the online system 140, as well as actions on third party systems 130 that communicate information to the online system 140. Users may interact with various objects on the online system 140, and information describing these interactions is stored in the action log 208. Examples of interactions with objects include: commenting on posts, sharing links, checking-in to physical locations via a mobile device, accessing content items, and any other suitable interactions. Additional examples of interactions with objects on the online system 140 that are included in the action log 208 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 208 may record a user's interactions with ads on the online system 140 as well as with other applications operating on the online system 140. In some embodiments, data from the action log 208 is used to infer interests or preferences of a user, augmenting the interests included in the user's user profile and allowing a more complete understanding of user preferences.

The action log 208 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 208 may record information about actions that users perform on a third party system 130, including webpage viewing histories, ads that were engaged, purchase histories, shopping cart statuses, and other patterns from shopping and buying. In one embodiment, the action log 208 stores events received from the client devices 110 to record information about the users' actions as further described below.

In one embodiment, the edge store 210 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 108, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 210 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Multiple interactions between a user and a specific object may be stored as a single edge in the edge store 210, in one embodiment. Alternatively, each interaction between a user and a specific object is stored as a separate edge. In some embodiments, connections between users may be stored in the user profile store 202, or the user profile store 202 may access the edge store 210 to determine connections between users.

The ad store 212 stores information associated with ad campaigns received from one or more advertisers. An ad campaign includes one or more ads for presentation to users of the online system 140. An ad includes content for presentation to users such as one or more images, video, text, audio or other types of media. In various embodiments, the ad content is associated with a network address specifying a landing page, or other destination, to which a user is directed when the ad is accessed. A bid amount is associated with an ad by an advertiser and is used to determine an expected value, such as monetary compensation, provided by an advertiser to the online system 140 if the advertisement is presented to a user, if the ad receives a user interaction, or based on any other suitable condition. For example, the bid amount specifies a monetary amount that the online system 140 receives from the advertiser if the ad is displayed and the expected value is determined by multiplying the bid amount by a probability of the advertisement being accessed.

An ad campaign is associated with one or more targeting criteria identifying one or more characteristics of eligible users to receive ads included in the ad campaign. Targeting criteria associated with ad campaigns specify one or more characteristics of users eligible to be presented with ads of ad campaigns. As one example, an advertiser targets an ad towards females in California who have interacted with the advertiser's page in the past 180 days. The targeting criteria may identify users by their demographic information (e.g., age range, gender, education level, etc.), geographic locations, hobbies or preferences, and the like. The targeting criteria may also identifying users that having actions or types of connections with another user or object of the online system 140. The targeting criteria may also specify interactions between a user and objects performed external to the online system 140, such as on a third party system 130. The targeting criteria may further identify users having a connection or a particular type of connection with another user or object of the online system or a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third party system 130, or any other suitable action.

In some embodiments, targeting criteria identify users based at least on a characteristic (e.g., an extent) of the users performing certain actions related to content provided by a third party system 130 (or an advertiser) within a time period. For example, users that have visited a particular website at least three times in a week, users that have visited the particular website within a week at a rate of at least 80-percentile among all users that have visited the website in the week, users that have viewed a page of a web site for at least 5 minutes in the past 5 days, users that have viewed a page for an accumulated duration that is at least 80-percentile among all users that have viewed the page in the week, users that have spent 100 USD making purchases at a website in 3 days, or users that have spent an accumulative amount that is at least 70-percentile among users who have made purchases at a website in the week, etc. Targeting criteria may identify users based at least on a characteristic (e.g., an extent) of the users performing certain actions such that advertisers can distinguish users performing certain actions at different degrees and thereby target different ads to different users to increase the likelihood of users interacting with the ads. For example, an advertiser targets ads of new products to users that have spent at least 200 USD making purchases at a website in 3 days and target ads of sale events to users that have spent at least 100 USD making purchases at a website in 3 days to increase a likelihood of users interacting with ads. Accordingly, targeting criteria allow an advertiser to identify users having specific characteristics (e.g., performing an action at a certain extent), allowing the advertiser to present users with ads in which the user is more likely to have an interest.

For an ad campaign, an advertiser (or the online system 130) provides aggregation rules for evaluating users' eligibility to receive an ad in real time based on the users' actions as reported by the third-party events. Because users' behavior are dynamic and unpredictable, evaluating users' eligibility in real time using the users' behavior allows advertisers to more closely track users' interests and present ads that are more likely to trigger users' interaction to users. An aggregation rule includes parameters that specify conditions for evaluating whether or not a user is eligible to receive one or more ads of an ad campaign of the advertiser. Different aggregation rules can specify different conditions and different ads for presentation to an eligible user. Example conditions include a time interval elapsed between a current time and a time when a user performed a specific type of action, types of actions performed by the user related to the content provided by a third party system 130 (e.g., viewing a webpage, visiting a website, making a purchase, adding an item to a shopping cart, etc.), a maximum amount of a purchase that a user has made at a website, a minimum amount of time that a user has spent at browsing a page of a website, an average amount of times that a user visits a website during a week, etc. By using aggregation rules and customizing report and characterization of the events, a third-party system can choose to keep the actual meanings of the events private from the online system 140, thereby to protect users' privacy while executing the third party's business strategy for determining when to present content in confidence. According to an aggregation rule, and events associated with a user's performed one or more actions relevant to the content, the online system 140 determines whether or not the user is an eligible user. In one embodiment, an aggregation rule specifies one or more types of actions used for evaluating characteristics of a user performing actions, a time period for evaluating characteristics of a user performing actions, and one or more characteristic thresholds. As another example, an aggregation rule specifies a function that outputs an action score given actions (e.g., viewing a page from a website, making a purchase at a website, etc.) performed by a user within a time period. The action score indicates characteristics of a particular user's actions. In one embodiment, an action score indicates a characteristic (e.g., an extent) of a particular user's action relative to other users and can be used to determine a user's eligibility for receiving ads of an ad campaign.

The aggregation rule module 214 manages identification of events and generation of one or more aggregation rules related to those events. In one embodiment, the aggregation rule module 214 provides an audience widget or a reference to an audience widget to one or more third party systems 130 to generate events of interest for an aggregation rule. For example, the audience widget is code or instructions for inclusion in content provided by the third party system 130 for execution by a client device 110 when received along with the content (e.g., a tracking pixel, JAVASCRIPT®, etc.). When the client device 110 executes the code or instructions comprising the audience widget, the client device 110 communicates events describing users' actions via the client device 110 to the online system 140 or to a third party system 130. An event includes user identification information identifying a user that performs an action and a description of the event. The user identification information may include a device type and an operating system of the user. Depending on the event, the event description may include a type of a user's action (e.g., viewing a webpage, visiting a website, making a purchase, adding an item to a shopping cart, etc.), an amount of time spent on a page a timestamp (e.g., a date, a time, etc.), a value or amount associated with the event. In some embodiments, the audience widget is configured to detect a user's every action performed related to content and to generate and transmit events corresponding to the detected actions. In some embodiments, the audience widget is configured to detect predetermined users' actions and generate and transmit events corresponding to the detected users' actions. In some embodiments, the audience widget may be created using a software development kit (SDK) provided to third party systems 130 by the online system 140.

For example, a third party system 130 includes the audience widget in one or more webpages provided by the third party system 130. When the third party system 130 provides a webpage, the third party system 130 may include the audience widget in the webpage provided to the client device 100 or may include a reference for the client device 110 to retrieve the audience widget (or any related information for the audience widget) from the online system 140. When the client device 110 identifies events, either from the user or as indicated by the third party system 130, the client device 110 communicates events to the online system 140. In some examples the event is communicated with a tracking pixel on the webpage. In some embodiments, the logic of which actions to capture and when to provide events to the online system 140 is executed by the audience widget on the client device 110. For example, due to one or more interactions between the user device 110 and the third party system 130, the audience widget collects information associated with user actions and interactions with the third party system to generate events and causes the user device 110 to provide the generated events and collected information associated with the events to the online system 140. In some embodiments the audience widget may cause the third party system 130 to communicate one or more aggregation rules along with the redirect request to the client device 110, which communicates the one or more aggregation rules to the online system 140 along with the events.

The events provided to the online system 140 includes user identification information associated with the user of the client device 110 and event information associated with the events. The events describe users' actions related to the content provided via the client device 110. The user identification information corresponds to a user profile associated with the user by the online system 140. In some embodiments, the user identification information is used by an application associated with the online system 140 and executing on the client device 110. Additionally, in some embodiments, the user identification information may include a cookie that identifies the client device 110, or an application executing on the client device 110 used to access content, to the online system 140.

In some embodiments, the aggregation rule module 214 provides a user interface to the third party system 130 to specify one or more aggregation rules and communicate the one or more aggregation rules to the online system 140. In some embodiments, an administrator of the third party system 130 may login to the online system 140 and create, edit, delete, or otherwise modify one or more aggregation rules via the user interface. In other embodiments, the third party system 130 generates the one or more aggregation rules and provides at least one of the generated aggregation rules to the online system 140 using any suitable method.

The aggregation rule store 216 stores one or more aggregation rules associated with one or more third party systems 130. For example, the aggregation rule store 216 includes an identifier associated with a third party system 130 and one or more aggregation rules associated with the identifier, simplifying retrieval of aggregation rules associated with a third party system 130. In some embodiments, information identifying content (e.g., uniform resource locators) associated with aggregation rules, such as content provided by a third party system 130 and associated with the aggregation rules, is also included in the aggregation rule store 216.

The audience module 218 determines a user's eligibility based on events received from the client device 110 associated with the user and one or more aggregation rules. As further described below in conjunction with FIGS. 3-4, the audience module 218 extracts user identification information and event information associated with an event that is received. Based on the extracted user identification information, the audience module 218 retrieves events associated with the particular user, for example, from the action log 208. In some embodiments, the audience module 218 retrieves events having the same event types as the received event. For example, in response to receiving an event having an event type of visiting a particular website, the audience module 218 retrieves only events associated with the user that have the event type of visiting the particular website. The audience module 218 may alternatively retrieve all events associated with the user and filters out the events that have the event type of visiting the particular website. Moreover, the audience module 218 retrieves events within a time period (e.g., a time period for evaluating characteristics of user's actions related to this time period). For example, based on the timestamp associated with the received event, the audience module 218 retrieves events associated with timestamps that are within the time period for evaluating the user's actions related to the time period or that are within the aggregation time period.

The audience module 218 applies an aggregation rule to evaluate a user's eligibility using the event received and events that are retrieved. The event received and events that are retrieved are hereinafter referred to as aggregated events. The audience module 218 determines characteristics (e.g., an extent) of a user's actions using the aggregated events according to the aggregation rule. These events may represent various user actions within the related time period. For example, the audience module 218 may calculate a rate of an event, an interval since an event last occurred, statistics related to an event value (e.g., mean, median, minimum, maximum, cumulative value, and so forth). The specific values to calculate may be specified by the aggregation rule. Since the events represent user actions, these may represent a user visiting a website or making purchases at a website during a time period, a time interval between two consecutive times when the user visiting a website or making purchases at a website, an accumulated (average, minimum, or maximum) amount of time that the user has spent browsing pages at a website within a time period, an accumulated (average, minimum, or maximum) amount of purchase that the user has spent at a website within a time period, and the like using the aggregated events.

The audience module 218 may compare the determined characteristics to characteristic thresholds to determine a user's eligibility according to the aggregation rule. For example, the audience module 218 compares the determined rate of the user visiting the website to a threshold rate and identifies the user as an eligible user if the determined rate is at least the threshold rate. As another example, the audience module 218 compares the determined time interval to a threshold time interval and identifies the user as an eligible user if the determined time interval is less than a threshold time interval. As a further example, the audience module 218 compares the determined amount of time (or the determined amount of purchase) to a threshold amount and identifies the user as an eligible user if the determined characteristic is at least the threshold amount. In some embodiments, the audience module 218 compares the determined amount of time to a scale of amount of time to identify a percentile of the user spending time performing actions relative to other users. The scale of amount of time is determined using events including event information associated with other users that have performed the same action(s) during a time period. The audience module 218 may select the other users who share one or more characteristics as the user that is being evaluated to generate the scale. The one or more characteristics may be selected from the targeting criteria of an ad campaign. For example, the audience module 218 may select the other users that are in the same geographic area as the user, that are in the same age group as the user, or that have the same hobby as the user, and the like.

If a user is determined to be ineligible, the audience module 218 reevaluates the user's eligibility at a later time after receiving the event corresponding to the user performing the action. The audience module 218 may also reevaluate a user at a predetermined time period (e.g., 3 days, 7 days) after receiving the event. In some embodiments, the re-evaluation is performed if no other events are received during the predetermined time period. In some embodiments, the re-evaluation is performed if no other events that are of the same event type as the received event during the predetermined time period.

The audience module 218 uses a function to re-evaluate a user's eligibility. For example, given events associated with the user as input to the function, the function outputs an action score indicating a measure of the user's action characteristics. The input events may be all events associated with the user, events associated with the user during a particular time period, events associated with the user that are of a particular event type, or events associated with the user that are of a particular event type during a particular time period. Accordingly, the action score may measure characteristics of a user performing a particular type of action or different types of actions. When the determined action score is at least a threshold score, the audience module 218 determines that the user is eligible.

In some embodiments, the audience module 208 assigns a numerical value to an event based on the event information associated with the event and provides the value to the function as input. For example, different numerical values are used to represent an action of visiting a website for a first time, an action of re-visiting a website that was last visited one day ago, an action of re-visiting a website that was last visited three days ago, an action of visiting a website for less than 1 minute, an action of visiting a website for over 5 minutes, an action of adding an item to a shopping cart, an action of checking out, an action of making a purchase of less than 30 USD, an action of making a purchase of over 100 USD, and the like. As a result, the action score may reflect a measure of a rate of a user visiting a website, an amount of time (e.g., aggregated, average, minimum, or maximum) that the user spends on browsing webpages of a website, an amount of purchase that the user spends at a website, or a combination thereof.

The audience module 208 may compare an action score determined for a user to a scale of action scores to determine a percentile of the user's action characteristics relative to other users. The scale of action scores is determined by providing events associated with other users that have performed the same action(s) (e.g., visiting a website, browsing a webpage, making a purchase, etc.) during the same time period as the user under evaluation as input to the function. As described previously, the audience module 218 may select the other users when determining the scale. When the determined percentile is at least a threshold percentile, the audience module 218 determines that the user is eligible.

The web server 220 links the online system 140 via the network 150 to the one or more client devices 110, as well as to the one or more third party systems 130. The web server 220 serves webpages, as well as other content, such as JAVA®, FLASH®, XML and so forth. The web server 220 may receive and route messages between the online system 140 and the client device 110, for example, instant messages, queued messages (e.g., email), text messages, short message service (SMS) messages, or messages sent using any other suitable messaging technique. A user may send a request to the web server 220 to upload information (e.g., images or videos) that are stored in the content store 210. Additionally, the web server 220 may provide application programming interface (API) functionality to send data directly to native client device operating systems, such as IOS®, ANDROID™, WEBOS® or BlackberryOS.

Behavior-Based Custom Audience Generation

Figure 3:
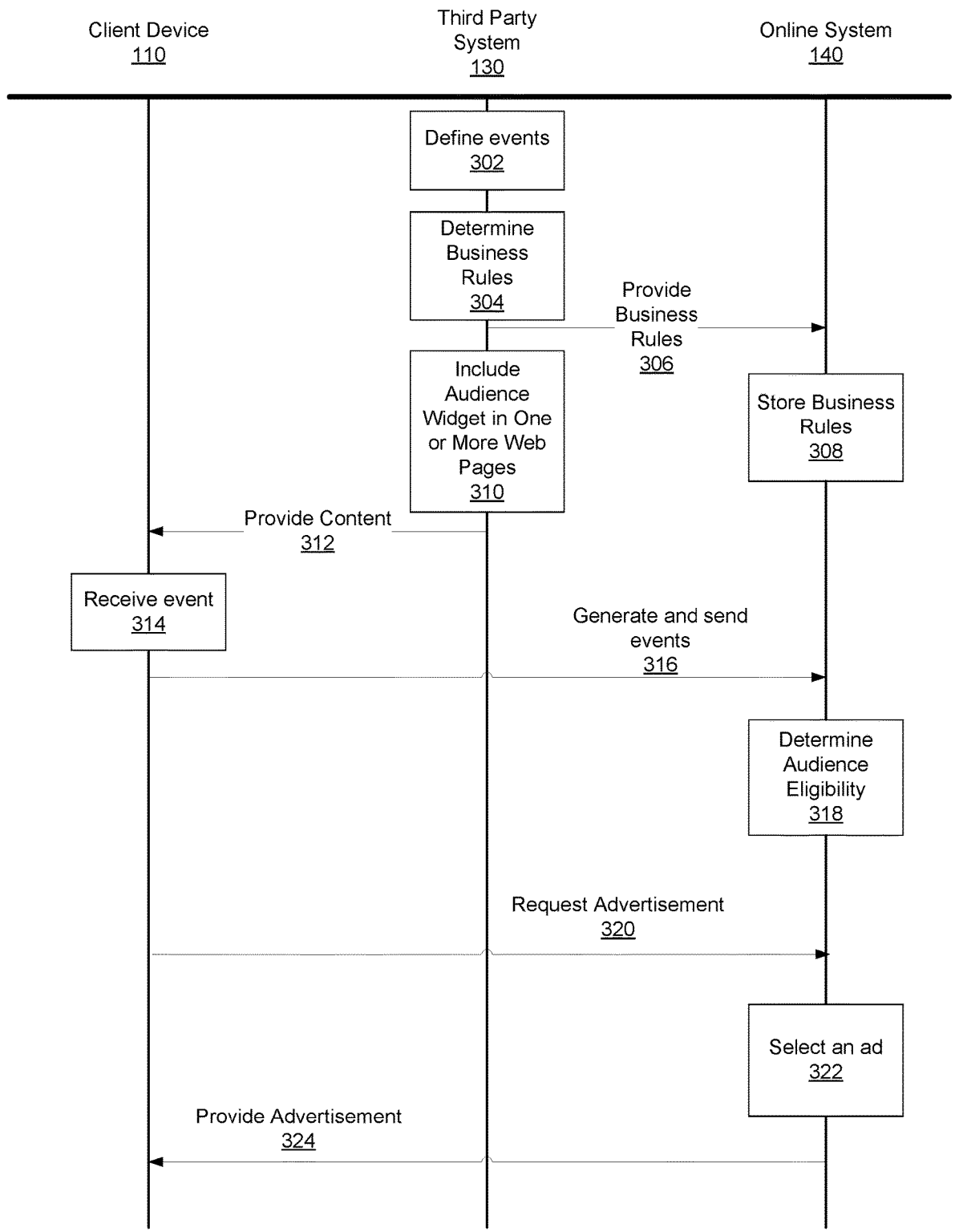
FIG. 3 is an interaction diagram illustrating an example method of generating custom audiences based on users' behavior.

FIG. 3 is an interaction diagram illustrating an example method of generating custom audiences based on users' behavior. In various embodiments, the method may include different and/or additional steps than those described in conjunction with FIG. 3. Additionally, in some embodiments, the steps may be performed in a different order than described in conjunction with FIG. 3. A third party system 130 starts an advertising campaign at an online system 140.

In one embodiment, the third party system 130 defines 302 events of interest. For example, the third party system 130 defines events for an audience widget to capture. The third party system 130 may additionally define a value representing an event having particular event information. The third party system 130 can receive a reference for the client device 110 to retrieve the audience widget (or any related information for the audience widget) from the online system 140. As described above in conjunction with FIG. 2, the audience widget comprises code or instructions for inclusion in content provided by the third party system 130. When a client device 110 presents content including the audience widget, the audience widget is executed and information specified by the audience widget is communicated to the third party system 130 or to the online system 140. In some embodiments, the information specified by the audience widget is determined by one or more custom parameters, as described above in conjunction with FIG. 2.

The third party system 130 determines 304 targeting criteria including one or more aggregation rules each identifying one or more characteristics of users eligible to receive ads of ad campaigns of an advertiser. In some embodiments, the third party system 130 uses a user interface provided by the online system 140 to create, edit, or delete one or more aggregation rules. For example, the third party system 130 is associated with a retailer and creates an aggregation rule indicating that users that have visited a web site five times over 10 days are eligible users for receiving a particular ad. The retailer also creates another aggregation rule indicating that users that have visited a website less than five times over 10 days are eligible users for receiving a different ad. The third party system 130 also configures when the online system 140 uses an aggregation rule to determine whether or not a user is eligible. For example, the online system 140 evaluates a user's eligibility each time an event corresponding to an action of the user is received. The online system 140 re-evaluates the user's eligibility at a later time (e.g., 3 days after receiving the event) if the user is determined to be ineligible.

In some embodiments, the third party system 130 provides 306 the one or more aggregation rules to the online system 140, which stores 308 the aggregation rules. Alternatively, the third party system 130 determines 304 the aggregation rules and includes information describing one or more of the aggregation rules in the audience widget. Hence, execution of the audience widget communicates the aggregation rules, along with additional information provided to the online system 140.

The third party system 130 includes 310 the audience widget to one or more webpages, applications, or other content provided by the third party system 130. For example, the third party system 130 includes the audience widget in webpages included in a website maintained by the third party system 130. The third party system 130 selects webpages, applications, or other types of content where users' actions are useful for determining users' eligibility to include the audience widget.

Content that is maintained by the third party system 130 and that includes the audience widget is provided 312 to a client device 110 associated with a user of the online system 140. When the client device 110 receives 314 a user's action as defined in the audience widget, the client device 110 communicates information describing the user's action to the third party system 130. For example, a user requests presentation of a webpage from the third party system 130 including the audience widget via the client device 110. Other examples of received actions include the user making a purchase of a product or service, the user browsing a webpage, the user adding an item to a wish list or shopping cart, the user providing a comment on presented content, the user requesting additional content, or a user indicating a preference for presented content.

The client device 110 receives 314 an event. The client device generates and transmits 316 events to the online system 140 when the redirect request is received by the client device 110. An event includes user identification information and event information describing a user's action, as described above in conjunction with FIG. 2. For example, the event information includes a timestamp of the user's action, a duration of the user's action, a type of the user's action, a product or service that the user has purchased or added to a shopping cart, an identifier of the content provided 322 by the third party system 130 (e.g., a uniform resource locator of the content), information identifying the third party system 130, and the like.

In response to receiving the event, the online system 140 determines 318 whether the event affects eligibility for receiving content associated with the event, details of which is further described with reference to FIG. 4. After identifying a user's eligibility, the online system 140 identifies an opportunity (such as the user visiting the online system or another page for which the online system selects and presents content) to present one or more advertisements to the user via the client device 110 or some other client device associated with the user. For example, the online system 140 receives 320 a request from the client device 110 to present one or more advertisements to the user.

The online system 140 selects 322 an ad from a set of ads included in an ad auction corresponding to the ad request. If a user is determined to be eligible to receive ads of ad campaigns provided by the third party system 130, the online system 140 selects one or more ads for inclusion in the ad auction according to the aggregation rule(s). The online system 140 may further determine a bid amount to be associated with each ad included in the ad auction, an expected value for each ad included in the ad auction, and a likelihood of the user accessing each ad included in the ad auction. To estimate the likelihood that a user will access an ad included in an ad auction, the online system 140 may use the user's affinities for targeting criteria, including audience information, associated with the ad or with other objects associated with the ad. The ads included in the ad auction are ranked based on their expected values, and the online system 140 selects an ad for presentation to the user based at least in part on the ranking. For example, the online system 140 selects the ad having the highest expected value. The online system 140 provides 326 the selected ad to the client device 110 or to another deice associated with the user for presentation to the user.

Figure 4:
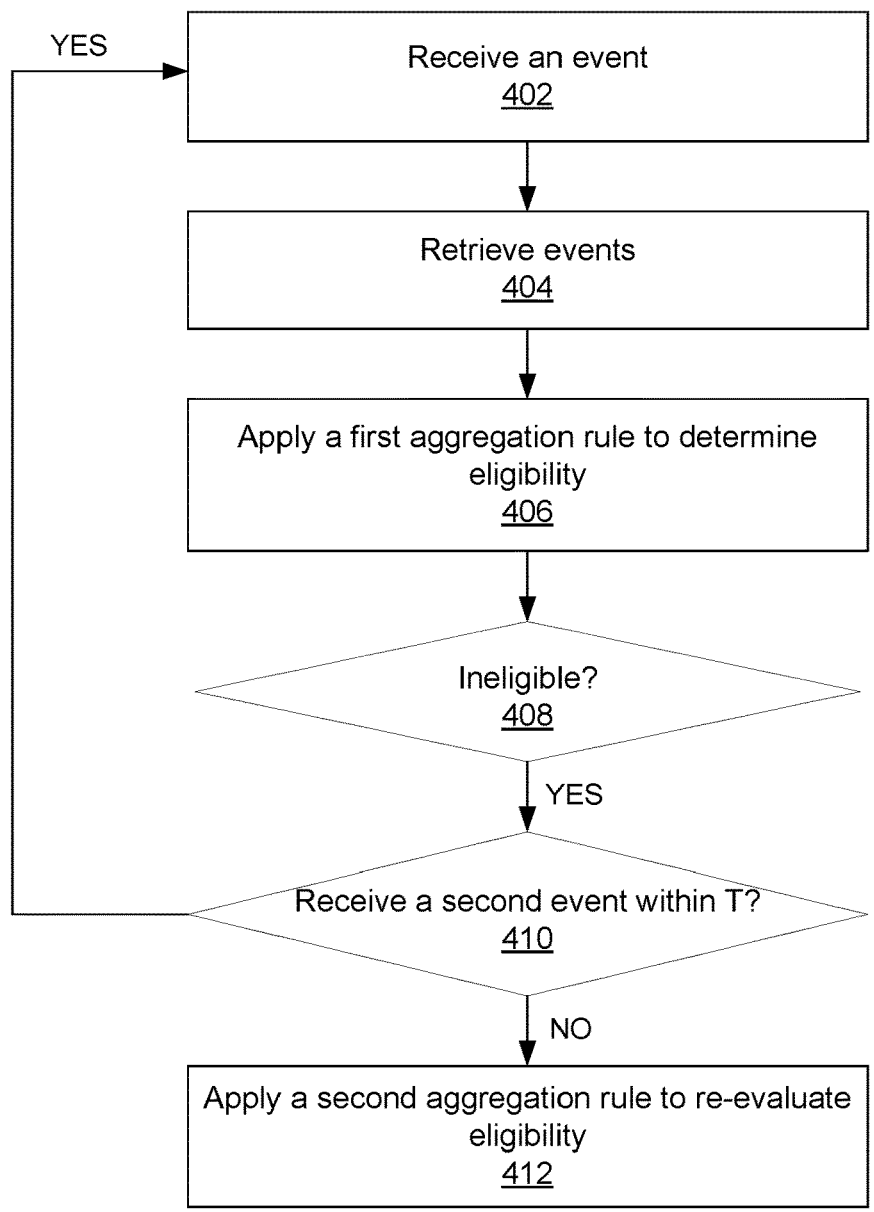
FIG. 4 is a flowchart of an example method of generating custom audiences based on users' behavior, according to one embodiment.

FIG. 4 is a flowchart of an example method of generating custom audiences based on users' behavior, according to one embodiment. The online system 140 receives 402 an event describing a user's action from a client device associated with the user of the online system 140. The user performs an action with respect to content (e.g., a website, a webpage, an application) of a third party system. The online system 140 extracts user identification information and event information associated with an event. Based on the event information, the online system 140 identifies one or more aggregation rules that may be applicable. For example, the online system 140 identifies a third party system 130 or an advertiser associated with the content (e.g., a website, a webpage, an application, etc.) where the user performs an action. The online system 140 identifies one or more aggregation rules associated with ad campaigns of the identified third party system 130 or advertiser. The online system 140 may also identify one or more aggregation rules that include parameters matching the user's action. For example, the online system 140 identifies an event type of the event and identifies one or more aggregation rules including parameters matching the event type.

The online system 140 retrieves 404 other events corresponding to actions performed by the user based on the user identification information. In some embodiments, the online system 140 retrieves events having the same event types as the received event. In some embodiments, the online system 140 retrieves all events associated with the user and filters out the events that have the event type as the received event. In some embodiments, the online system 140 retrieves events associated with the user having timestamps within a predetermined time period (e.g., a time period for evaluating a characteristic of the user's actions, an aggregation time period for aggregating events associated with a user.)

The online system 140 applies 406 a first aggregation rule to determine the user's eligibility to receive ads of ad campaigns of the identified advertiser or the third party system 130. The online system 140 evaluates whether the conditions defined in the first aggregation rule are satisfied using the received event and retrieved events. If the conditions are met, the online system 140 determines that the user is eligible. For example, the online system 140 evaluates if the user has spent at least a threshold amount of time at a website, if the user has revisited a webpage in less than a threshold time interval, if the user has made at least a minimum amount of purchase at a website, and the like. The online system 140 analyzes the aggregated events (i.e., the received event and the retrieved events) according to the first aggregation rule to evaluate whether or not the conditions are met. For example, the online system 140 compares the timestamps of the received event and a retrieved event with the most recent timestamp and having the same event type to determine an interval of the user performing the same action. As another example, the online system 140 determines a number of times a user performing an action within the time period. As a further example, the online system 140 aggregates the amount of time or amount of purchase associated with events within a time interval to determine an aggregated amount of time (or an aggregated amount of purchase) the user has spent at a website. The online system 140 may also determine an average amount of time (or an average amount of purchase) by dividing the aggregated amount of time (or an aggregated amount of purchase) by a quantity of events aggregated over the time period. Similarly, the online system 140 can identify a minimum (or maximum) amount of time (or purchase) that the user has spent at a website. The online system 140 compares the determined value (e.g., an interval of a user performing an action, a rate of a user performing an action, an amount of time that the user spent at a website, or an amount of purchase that the user spent at a website) to a threshold to evaluate the user's eligibility. The online system 140 may also compare the determined value to a scale to determine a percentile and compares the percentile to a threshold to evaluate the user's eligibility.

When the online system 140 determines 408 that a user is ineligible, the online system 140 reevaluates the user's eligibility at a later time. The online system 140 reevaluates the user's eligibility if the online system 140 receives 410 no other events of the same event type within a predetermined time after receiving the event. Alternatively, the online system 140 reevaluates the user's eligibility if no other events that are associated with the user are received within a predetermined time after receiving the event. The online system 140 applies 412 a second aggregation rule to re-evaluate the user's eligibility. The second aggregation rule comprises a function that outputs an action score indicating a measure of the user's action characteristics given events associated with the user as input. The action score may measure a characteristic of a user performing a particular type of action or different types of actions. The input events may be all events associated with the user, events associated with the user during a particular time period, events associated with the user that are of a particular event type, or events associated with the user that are of a particular event type during a particular time period. The online system 140 may compare the determined action score to a threshold score to determine a user's eligibility. The online system 140 may also compare the determined action score to a scale of scores to determine a percentile of the user's characteristic of action(s) relative to other users within a time period. The user is eligible (or ineligible) if the determined percentile is at least (or less than) a threshold percentile.

Other Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
providing, by an online social networking system to a third party system, instructions to track user interactions with content of the third party system;
receiving, by the online social networking system, from a client device associated with a user of the online social networking system, a current event corresponding to a current action of the user related to the content provided by the third party system in real time;
responsive to receiving the current event, retrieving, by the online social networking system, a set of past events recorded in a profile of the user corresponding to a set of previous actions of the user related to the content provided by the third party system;
determining, by the online social networking system, a first action characteristic of the user related to the content provided by the third party system based on the current event and the set of past events according to a first aggregation rule associated with the third party system, the first action characteristic describing at least an extent of the user interacting with the content provided by the third party system;
responsive to determining that the first action characteristic does not satisfy one or more characteristic thresholds, determining, by the online social networking system, that the user is ineligible to receive a content item provided by the third party system at a first time;
determining, by the online social networking system, whether the user remains ineligible to receive the content item provided by the third party system at a second time that is a predetermined amount of time later than the first time;
responsive to determining that the user remains ineligible at the second time, determining, by the online social networking system, a second action characteristic of the user related to the content provided by the third party system based on the current event and the set of past events according to a second aggregation rule associated with the third party system; and
responsive to determining that the second action characteristic satisfies the one or more characteristic thresholds, determining, by the online social networking system, that the user is eligible to receive the content item provided by the third party system and providing the content item to the client device for display on the online social networking system.

2. The computer-implemented method of claim 1, wherein the current action of the user and the set of previous actions of the user are of a same type, and wherein determining, by the online social networking system, the first and second action characteristics comprises determining at least one selected from a group consisting of an interval of the user performing the current action, a rate of the user performing the current action, an aggregated amount of time of the user performing the current action, and an aggregated amount of purchase of the user performing the current action.

3. The computer-implemented method of claim 2, wherein the current event and the set of past events are associated with a plurality of timestamps within a time period.

4. The computer-implemented method of claim 1, wherein the second aggregation rule comprises a function configured to receive the current event and the set of past events as input and to output an action score indicating the second action characteristic.

5. The computer-implemented method of claim 4, further comprising comparing, by the online social networking system, the action score to a scale of scores to determine a percentile of actions of the user relative to other users, the scale of scores generated by applying the function to events associated with the other users.

6. The computer-implemented method of claim 5, wherein the current event and the set of past events are associated with a plurality of timestamps within a time period, and wherein the events associated with the other users are associated with timestamps within the time period.

7. The computer-implemented method of claim 1, wherein the first and second aggregation rules identify the content item provided by the third party system.

8. The computer-implemented method of claim 1, wherein the receiving the current event comprises:
receiving, by the online social networking system, the current event generated responsive to the client device executing one or more instructions included in content presented to the user and detecting the action of the user.

9. The computer-implemented method of claim 1, further comprising:
receiving, by the online social networking system from the client device, a request for content items; and
providing, by the online social networking system, the content item from the third party system in response to receiving the request.

10. A system comprising:
a processor; and
non-transitory memory storing instructions thereon that, when executed by the processor, cause the processor to perform:
providing, by an online social networking system to a third party system, instructions to track user interactions with content of the third party system;
receiving, by the online social networking system from a client device associated with a user of the online social networking system, a current event corresponding to a current action of the user related to the content provided by the third party system in real time;
responsive to receiving the current event, retrieving, by the online social networking system, a set of past events recorded in a profile of the user corresponding to a set of past actions of the user related to the content provided by the third party system;
determining, by the online social networking system, a first action characteristic of the user related to the content provided by the third party system based on the current event and the set of past events according to a first aggregation rule associated with the third party system, the first action characteristic describing at least an extent of the user interacting with the content provided by the third party system;

responsive to determining that the first action characteristic does not satisfy one or more characteristic thresholds, determining, by the online social networking system, that the user is ineligible to receive a content item provided by the third party system at a first time;

determining, by the online social networking system, whether the user remains ineligible to receive the content item provided by the third party system at a second time that is a predetermined amount of time later than the first time;

responsive to determining that the user remains ineligible at the second time, determining, by the online social networking system, a second action characteristic of the user related to the content provided by the third party system based on the current event and the set of past events according to a second aggregation rule associated with the third party system; and responsive to determining that the second action characteristic satisfies the one or more characteristic thresholds determining, by the online social networking system, that the user is eligible to receive the content item provided by the third party system and providing the content item to the client device for display on the online social networking system.

11. The system of claim 10, wherein the current action of the user and the set of previous actions of the user are of a same type, and wherein determining, by the online social networking system, the first and second action characteristics comprises determining at least one selected from a group consisting of an interval of the user performing the current action, a rate of the user performing the current action, an aggregated amount of time of the user performing the current action, and an aggregated amount of purchase of the user performing the current action.

12. The system of claim 11, wherein the current event and the set of past events are associated with a plurality of timestamps within a time period.

13. The system of claim 10, wherein the second aggregation rule comprises a function configured to receive the current event and the set of past events as input and to output an action score indicating the second action characteristic.

14. The system of claim 13, wherein the instructions are configured to cause the processor to further perform comparing, by the online social networking system, the action score to a scale of scores to determine a percentile of actions of the user relative to other users, the scale of scores generated by applying the function to events associated with the other users.

15. The system of claim 14, wherein the current event and the set of past events are associated with a plurality of timestamps within a time period, and wherein the events associated with the other users are associated with timestamps within the time period.

16. The system of claim 10, wherein the first and second aggregation rules identify the content item provided by the third party system.

17. The system of claim 10, wherein the receiving the current event comprises:

receiving, by the online social networking system, the current event generated responsive to the client device executing one or more instructions included in content presented to the user and detecting the action of the user.

18. The system of claim 10, wherein the instructions are configured to cause the processor to further perform:

receiving, by the online social networking system from the client device, a request for content items; and providing, by the online social networking system, the content item from the third party system in response to receiving the request.

19. A computer program product comprising a computer-readable storage medium having instructions encoded thereon that, when executed by a processor, cause the processor to perform:

providing, by an online social networking system to a third party system, instructions to track user interactions with content of the third party system;

receiving, by the online social networking system, from a client device associated with a user of the online social networking system, a current event corresponding to a current action of the user related to the content provided by the third party system in real time;

responsive to receiving the current event, retrieving, by the online social networking system, a set of past events recorded in a profile of the user corresponding to a set of past actions of the user related to the content provided by the third party system;

determining, by the online social networking system, a first action characteristic of the user related to the content provided by the third party system based on the current event and the set of past events according to a first aggregation rule associated with the third party system, the first action characteristic describing at least an extent of the user interacting with the content provided by the third party system;

responsive to determining that the first action characteristic does not satisfy one or more characteristic thresholds, determining, by the online social networking system, that the user is ineligible to receive a content item provided by the third party system at a first time;

determining, by the online social networking system, whether the user remains ineligible to receive the content item provided by the third party system at a second time that is a predetermined amount of time later than the first time;

responsive to determining that the user remains ineligible at the second time, determining, by the online social networking system, a second action characteristic of the user related to the content provided by the third party system based on the current event and the set of past events according to a second aggregation rule associated with the third party system; and responsive to determining that the second action characteristic satisfies the one or more characteristic thresholds, determining, by the online social networking system, that the user is eligible to receive the content item provided by the third party system and providing the content item to the client device for display on the online social networking system.

\* \* \* \* \*